United States Statutory Invention Registration [19]

[11] Reg. Number: H518

Gentiluomo

[43] Published: Sep. 6, 1988

[54] END CONSTRAINTS FOR TORSION MEMBERS

[75] Inventor: Joseph A. Gentiluomo, Schenectady, N.Y.

[73] Assignee: The United States of America as represented by the Secretary of the Army, Washington, D.C.

[21] Appl. No.: 38,383

[22] Filed: Apr. 10, 1987

Related U.S. Application Data

[63] Continuation of Ser. No. 340,428, Jan. 18, 1982, abandoned.

[51] Int. Cl.[4] ..... B60G 11/18; F16F 1/14

[52] U.S. Cl. ..... 267/283; 267/273

[56] References Cited

U.S. PATENT DOCUMENTS

| | | | |
|---|---|---|---|
| 2,606,020 | 8/1952 | Anderson | 267/57 |
| 3,243,175 | 3/1966 | Sherwood | 267/57 |
| 3,276,762 | 10/1966 | Thomas | 267/57 X |

*Primary Examiner*—Harold J. Tudor

*Attorney, Agent, or Firm*—Anthony T. Lane; Harold H. Card, Jr.; Michael C. Sachs

[57] ABSTRACT

This invention pertains to end constraints for torsion members applicable for use in cannon breech closing mechanisms, vehicle suspensions, etc. To provide torsion members with greater load carrying ability when subjected to large magnitudes of twist, special end constraints are required. The instant invention features end constraints with substantially square or rectangular cavities having a pair of opposing surfaces contoured such as to eliminate or minimize transverse shear within the ends of the torsion member at the region of transition between the active and non-active portions. These contoured surfaces have opposed oblique surfaces diagonally spaced in a transverse direction with respect to the trailing face of the constraints. To facilitate manufacture, the end constraints can be made to feature surface contoured inserts fixedly mounted within the sockets. It should be ascertained that two end constraints are used to apply moments at the ends of a torsion member. One end constraint is fixedly mounted and the other is rotatably mounted, such as to transmit torque from the rotated end constraint on through the torsion member to the fixed end constraint.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

END CONSTRAINTS FOR TORSION MEMBERS

This application is a continuation of application Ser. No. 340,428, filed Jan. 18, 1982, now abandoned.

BACKGROUND OF THE INVENTION

This invention pertains to the field of end constraints for torsion bar springs of the solid or laminated type.

Due to the design of presently available end constraints, the magnitude of twist and the load carrying ability of torsion members are substantially limited. One prior art end constraint design for square or rectangular torsion members, features a socket that fits tightly around the end portions of said torsion members. The main disadvantage of this design is that under large torsion member twist, high transverse shear stress prevails within the ends of the torsion member at the transition region between the active and non-active portions, to cause permanent deformation and premature fatigue failure. Also, due to lack of torsion member side clearance within the constraint cavity, the ends of said torsion member will be restrained from curling freely, thereby causing said torsion member to undergo buckling at a distance remote from the trailing faces of said end constraints.

Another design disclosed in U.S. Pat. No. 2,606,020, features an end constraint design having two obliquely opposed support surfaces diverging in the longitudinal direction to form a wedge type cavity that engages the torsion member such as to provide edge contact along its extreme ends. Under large torsion member twist, this design becomes unsuitable because the resulting high edge contact stresses will cause permanent deformation and premature fatigue failure within the overstressed area of the torsion member ends. It should also be noted that as the torsion member is twisted, it shortens in length, thereby causing the ends of the torsion member to move toward the diverging direction with the end constraint cavity. This shortening effect results in a reduction of output load per amount of constraint twist, when compared to end constraints having flat parallel opposing support surfaces.

SUMMARY OF THE INVENTION

Since it is common knowledge that torsion members are particularly subject to fatigue failure between the active and non-active portions of said torsion members, it is the intent of this invention to overcome the deficiencies of prior art torsion member end contraints which promote premature failure. This is accomplished by applying torsional load to the torsion member through end constraints having identically opposed specially contoured support surfaces that are adapted to engage said torsion member ends in such a manner as to minimize or eliminate said premature failure. Therefore, the instant invention avoids said premature fatigue failure through novel end constraints which subject said torsion member ends to transverse bending between said torsion member's active and non-active portions. To further emphasize the advantages of the invention over the prior art, the following objects of the invention are presented:

To provide end constraints functional with both solid torsion bars, and laminated leaf spring packs.

To provide constraints that can subject torsion members to greater twist and loading, without undergoing yielding or premature fatigue failure.

To provide end constraints that are adaptable for either unidirectional and/or bidirectional torsional loading of torsion members.

To provide end constraints that allow the ends of the torsion member to freely move longitudinally and transversely therein.

To provide end constraints that subject the ends of torsion members to substantially low stress at substantially large angles of twist.

To provide end constraints that avoid subjecting torsion members to buckling.

To provide end constraints that avoid destructive bearing and shear stresses in a region between the active and non-active portions of the torsion member.

To provide end constraints that avoid loss of output load due to torsion member shortening during subjected angular twist.

The above objects and other objects of the invention will become more fully understood when taken in conjunction with the following detailed description and the accompanying drawings, of which:

DESCRIPTION OF THE INVENTION

Figure 1:
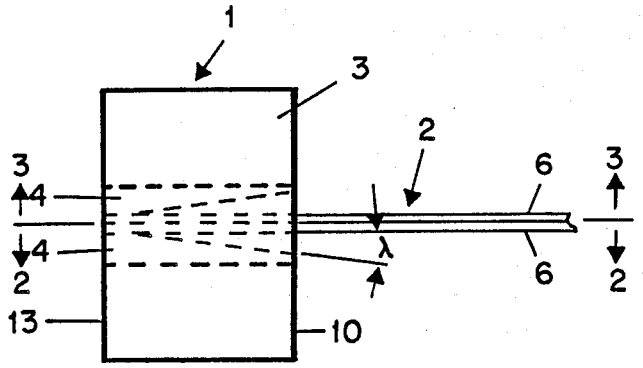
FIG. 1 is a front elevation view of the unidirectional end constraint showing a fragmentary portion of a torsion member consisting of two leaf springs.
Figure 4:
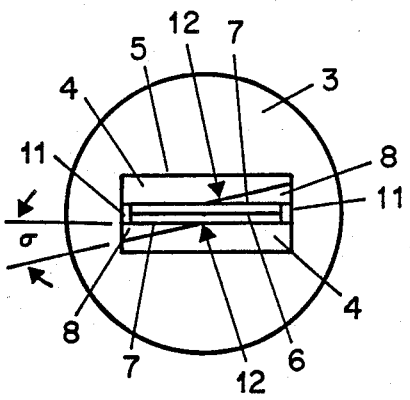
FIG. 4 is a right side view of FIG. 1, showing the torsion member in the untorqued condition.
Figure 2:
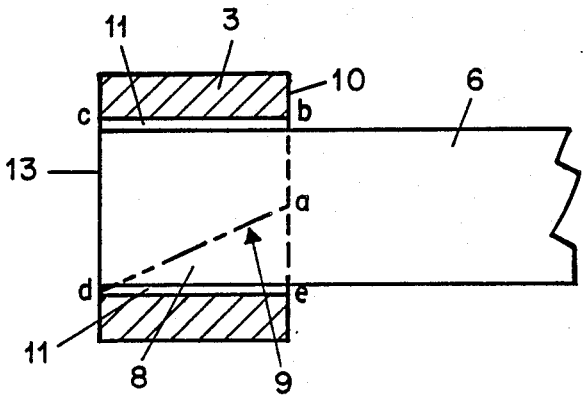
FIG. 2 is a sectional view taken along 2—2 of the unidirectional end constraint showing a fragmentary portion of the lower leaf spring.
Figure 5:
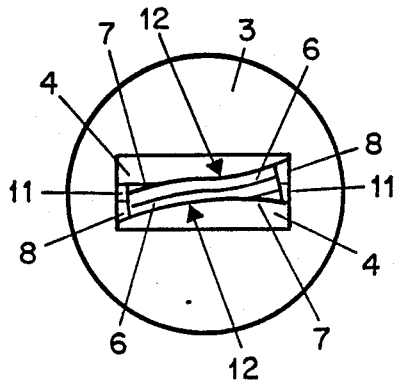
FIG. 5 is a right side view of FIG. 1, showing the torsion member subjected to counterclockwise torsion.
Figure 3:
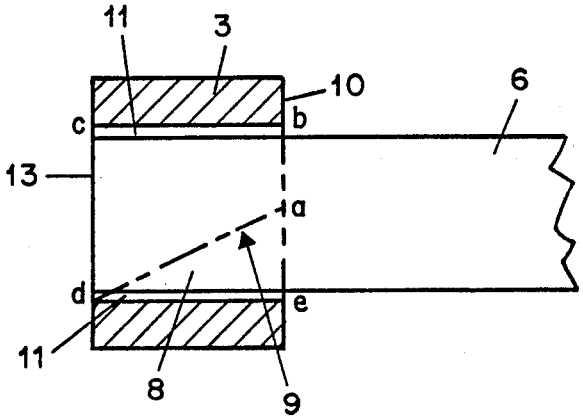
FIG. 3 is a sectional view taken along 3—3 of the unidirectional end constraint showing a fragmentary portion of the upper leaf spring.
Figure 6:
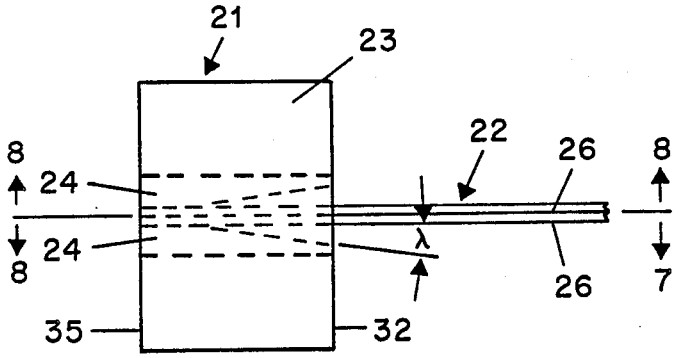
FIG. 6 is a front elevation view of the bidirectional end constraint showing a fragmentary portion of a torsion member consisting of two leaf springs.

FIGS. 1–5 depict unidirectional end constraint 1 used to provide counterclockwise torque to torsion members 2. Said torsion member can be of the solid, or laminated type having a plurality of leaf springs. As depicted, said torsion member consists of two leaf springs 6 which are made of flat strips having a width substantially greater than the thickness. To facilitate manufacture, each end constraint 1 is designed to contain a pair of inserts 4 within socket 3. Said inserts 4 are fixedly mounted within said socket by means well known in the fastening art. Socket 3 can be made to contain a square cavity, or a rectangular cavity 5 such as shown in FIG. 4. Each insert 4 has a contoured socket characterized by a flat support surface 7, and an oblique surface 8 which can be either flat or convex. Said flat support surface 7 is depicted in FIGS. 2 and 3 as circumscribed by points a b c d, and said oblique surface 8 is depicted as circumscribed by points a d e. Said flat support surface 7 interfaces said oblique surface through rounded diagonal edge 9. The radius of curvature 12, of rounded diagonal edge 9, decreases progressively from trailing face 10 toward leading face 13. It should be noted that said oblique surface 8 is established through consideration of torsion member helix angle "λ", and transverse relief angle "σ". Due to twisting of the torsion member 2, its longitudinal edge forms a helix angle "λ" of magnitude determined by the maxium twist to which said torsion member 2 is subjected. The transverse relief angle "σ" is of such value as to minimize or eliminate transverse shear stress within the torsion member adjacent to the insert edge established by oblique surface 8 and trailing face 10 of insert 4, during torsion member twist. As depicted in FIGS. 4 and 5, an identical pair of inserts 4 are fixedly positioned within cavity 5 of end constraint 1 such that opposed oblique surfaces 8 are diagonally spaced transversely at the trailing face 10 of said inserts. Torsion member 2 is slidably mounted longitudinally and transversely between the upper and lower flat support surfaces 7 of said pair of identical inserts 4. Clearances 11 located between the side walls of cavity 5 and torsion member sides, are provided to allow leaf spring transverse end curl. It should be noted that said end constraint 1 can be constructed to assume any external form to suit design requirements.

Before application of torsion member twist, leaf springs 6 will be flat and undistorted between opposing flat support surfaces 7, as depicted in FIG. 4. When said leaf springs are twisted, the active portions of the outermost leaf spring ends will bend transversely around rounded diagonal edge 9 toward oblique surface 8. Said rounded diagonal edge 9 provides for smooth gradual transition between said flat and said oblique surfaces, for the purpose of minimizing operational stress within the end portions of said leaf springs 6. It can therefore be discerned that this design avoids the imposition of high shear stress between the active and non-active portions of said leaf springs. The instant invention avoids high transverse shear stresses common within most presently used end constraints, by subjecting said leaf springs 6 to gradually applied bending stress when said springs bend around rounded diagonal edges 9. With reference to FIG. 5, it can be discerned that counterclockwise twisting of leaf springs 6 within end constraint 1, will urge said leaf springs to follow the inner surface contour of said inserts 4. The right hand portion of said leaf springs will bend upward around varying radius 12 of upper insert's diagonal edge 9, and the left hand portion will bend downward around varying radius 12 of the lower insert's diagonal edge 9.

Figure 9:
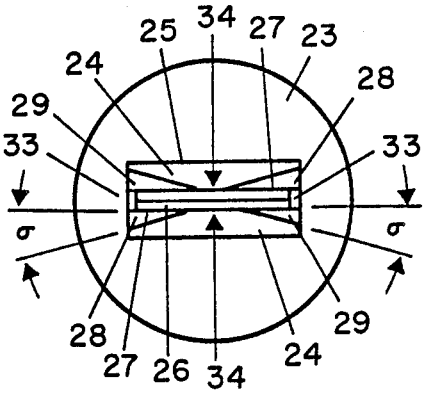
FIG. 9 is a right side view of FIG. 6 showing the torsion member in the untorqued condition.
Figure 7:
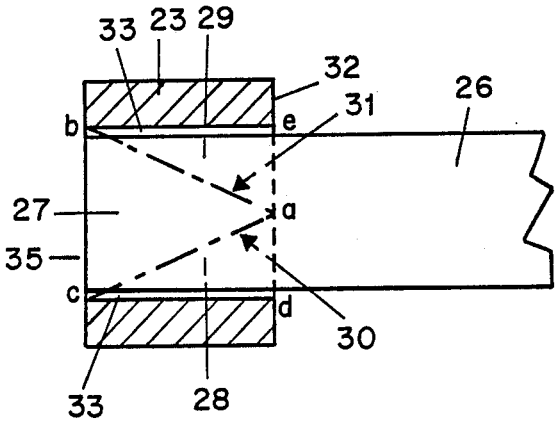
FIG. 7 is a sectional view taken along 7–7 of the bidirectional end constraint showing a fragmentary portion of the lower leaf spring.
Figure 8:
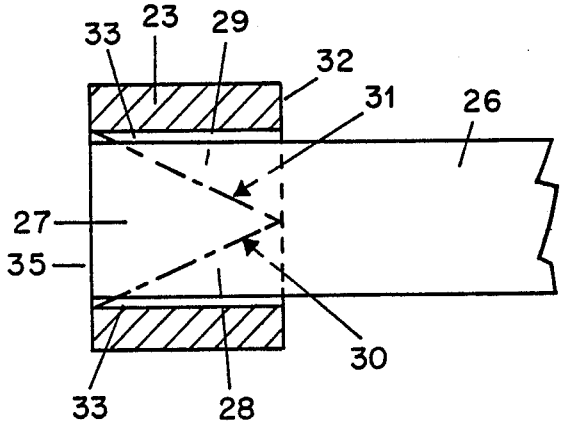
FIG. 8 is a sectional view taken along 8—8 of the bidirectional end constraint showing a fragmentary portion of the upper leaf spring.

FIGS. 6–11 depict a bidirectional end constraint 21 used to provide bidirectional torque to torsion member 22. As depicted, said torsion member consists of two leaf springs 26 which are made of flat strips having a width substantially greater than the thickness. Socket 33 contains a pair of inserts 24 fixedly mounted therein by means well known within the fastening art. Socket 23 can be made to contain either a square or rectangular cavity 25. Each insert 24 has a contoured surface characterized by a flat support surface 27, and oblique surfaces 28 and 29 which can be either flat or convex. Said flat support surfaces 27 of both upper and lower inserts 24 are depicted in FIGS. 7 and 8 as circumscribed by points a b c, said oblique surfaces 28 as circumscribed by points a c d, and said oblique surfaces 29 as circumscribed by points a b e. Flat support surface 27 interfaces said oblique surface 28 and 29 through rounded diagonal edges 30 and 31, respectively. The radius of curvature 34 is common to both rounded diagonal edges 30 and 31, at trailing face 32. Said radius of curvature decreases progressively along rounded diagonal edges 30 and 31, from trailing face 32 toward leading face 35. It should be noted that oblique surfaces 28 and 29 are established through consideration of torsion member helix angle "λ", and transverse relief angle "σ". These angles are determined in that same manner as those described in the first embodiment. As depicted in FIG. 9, an identical pair of inserts 24 are positioned within cavity 25 of end constraint 21 such that opposed oblique surfaces 28 and oblique surfaces 29 are diagonally spaced transversely at the trailing faces 32 of said inserts. Again, torsion member 22 is slidably mounted longitudinally and transversely between the upper and lower flat support surfaces 27 of said pair of identical inserts. Clearances 33 located between the side walls of cavity 25 and torsion member sides, are provided for leaf spring transverse curl.

Figure 10:
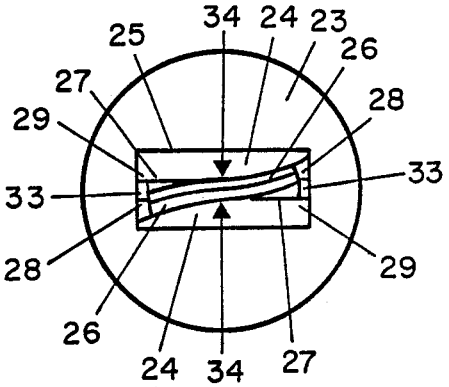
FIG. 10 is a right side view of FIG. 6, showing the torsion member subjected to counterclockwise torsion.
Figure 11:
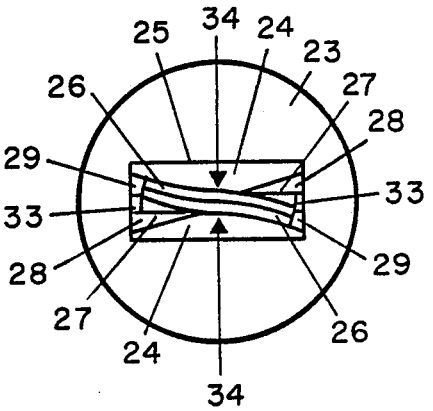
FIG. 11 is a right side view of FIG. 6, showing the torsion member subjected to clockwise torsion.

Before application of torsion member twist, leaf springs 26 will be flat and undistorted between flat support surfaces 27, as depicted in FIG. 9. When leaf springs 26 are twisted counterclockwise, the active portions of the outermost leaf spring ends will bend transversely around rounded diagonal edges 30, toward oblique surfaces 28. With reference to FIG. 10, it can be discerned that counterclockwise twisting of the leaf springs 26 within end constraint 21, will urge the leaf spring ends to follow the inner surface contour of said inserts 24. The right hand portion of said leaf spring ends will bend upward around varying radius 34 of the upper insert's diagonal edge 30, and the left hand portion will bend downward around varying radius 34 of the lower insert's diagonal edge 30. Clockwise twisting of leaf springs 26 within end constraint 21 as depicted in FIG. 11, will urge the leaf spring end to follow the inner surface contour of said inserts 24. The right hand portion of said leaf springs will bend downward around varying radius 34 of the lower insert's diagonal edge 31, and the left hand portion will bend upward around varying radius 34 of the upper insert's diagonal edge 31.

Having thusly described the invention, the following is claimed:

1. An end constraint for transmitting torsional load to a torsion member, comprising:
   (a) a socket having opposed upper and lower contoured inner surfaces for containing the end portion of said torsion member therebetween;
   (b) said contoured inner surfaces consisting of flat support surfaces interconnecting along a diagonal edge with oblique surfaces;
   (c) said oblique surfaces being opposed and spaced diagonally in a transverse direction with respect to the trailing face of said socket.

2. The invention as defined by claim 1, wherein said contoured inner surfaces are further characterized as having opposed parrallel support surfaces and adjacent functionally associated oblique surfaces.

3. The invention as defined by claim 2, wherein said contoured inner surfaces are further characterized as having a rounded diagonal edge forming an interface between said flat support surfaces and said oblique surfaces.

4. The invention as defined by claim 3, wherein said socket is further characterized as having an upper fixedly mounted insert for containing said upper contoured inner surface, and a lower fixedly mounted insert for containing said lower contoured inner surface.

5. The invention as defined by claim 1, wherein each of said contoured inner surfaces are further characterized as having a flat support surface and two adjacent functionally associated oblique surfaces.

6. The invention as defined by claim 5, wherein said contoured inner surfaces are further characterized as having a rounded diagonal edge forming an interface between said flat support and oblique surfaces.

7. The invention as defined by claim 5, wherein said socket is further characterized as having an upper fixedly mounted insert for containing said upper contoured inner surface, and a lower fixedly mounted insert for containing said lower contoured inner surface.

* * * * *